March 22, 1938.  G. KLINKENSTEIN  2,112,030

LAMINATED MATERIAL

Filed April 3, 1935

INVENTOR
Gustave Klinkenstein,
BY
George D. Richards
ATTORNEY

Patented Mar. 22, 1938

2,112,030

UNITED STATES PATENT OFFICE 2,112,030

LAMINATED MATERIAL

Gustave Klinkenstein, Maplewood, N. J.

Application April 3, 1935, Serial No. 14,414

4 Claims. (Cl. 154—46)

This invention relates, generally, to laminated material and to the method of producing the same, and the invention has reference, more particularly, to a novel laminated material consisting of a plurality of united layers of similar or dissimilar materials, the said laminated material being especially suitable for use in making collars, cuffs, shirt fronts, dresses, shoes, etc.

Heretofore, collars, cuffs, shirt fronts, and other articles have generally been made of one or more layers of fabric material, such as cotton duck, and in order to give these articles the desired stiffness in use, it is customary to starch the articles each time they are laundered. Not only does the starching of articles require additional expense and effort and some skill in preparing the articles for use, but also the starched articles are not entirely satisfactory in use owing to the tendency of such articles to soften in the presence of perspiration or moisture.

The principal object of the present invention is to provide a novel laminated material and method of making the same, whereby articles produced therefrom will retain a definite desirable stiffness indefinitely, the said articles being adapted for easy laundering without the necessity of starching the same.

Another object of the present invention lies in the provision of a novel laminated material of the above character that is not softened or distorted by perspiration or moisture from the body of the wearer, thereby retaining its desired shape in use.

Still another object of the present invention is to provide a novel laminated material having an inner layer of fabric or other suitable material that is sized with nitrocellulose or other cellulosic derivative to give such layer a desired stiffness, and an outer layer or layers of fabric or fibrous material, leather, metal foil, composition material or other desired material is adhered to said inner layer by the use of a thermoplastic cement, such adhesion taking place by the use of heat and/or pressure.

Other objects and advantages of this invention, not at this time more particularly enumerated, will be clearly understood from the following detailed description of the same.

The method of producing the novel laminated material is illustrated in the drawing, wherein.

Similar characters of reference are employed in all of the above described views to indicate corresponding parts.

Figure 1:
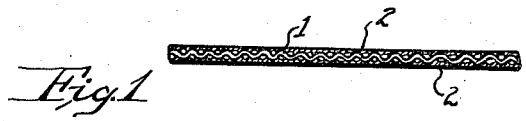
Fig. 1 is an enlarged fragmentary sectional view showing a fabric sized or impregnated with nitrocellulose or other suitable cellulosic derivatives.

Referring now to the said drawing, the reference numeral 1 designates a fabric such as cotton goods, although I may wish to use fibrous material such as paper or other porous or semi-porous material to serve as a base or inner layer material. In carrying out my novel method, I first size or stiffen the fabric 1 preferably with a nitrocellulose solution which may have the following composition, the ingredients being used in the percentages given by weight:

| | Percent |
|---|---|
| Nitrocellulose | 17 |
| Volatile solvent | 83 |

This size, designated 2 in the drawing, may be applied to the fabric 1 by brushing, roller or knife coating, spraying or by dipping the fabric into the nitrocellulose solution. Any suitable volatile solvent or solvent mixture for nitrocellulose may be used in the above solution, for example, an ester such as ethyl, butyl or amyl acetate, either alone, or in combination with alcohols and/or hydrocarbons or ketones in similar combinations. The sized fabric 1 is then allowed to dry thoroughly, whereupon the same assumes a desired stiffness that is unaffected by moisture or perspiration, the said size 2 remaining in the fabric 1 regardless of repeated washing or laundering.

The degree of stiffness of the sized fabric may be varied as desired by varying the percentage of the nitrocellulose used in the size and by the use of plasticizer such as tricresyl phosphate and triphenyl phosphate. Thus, a somewhat less stiff fabric than that obtained above is produced by using the following formula:

| | Percent |
|---|---|
| Nitrocellulose | 17 |
| Tricresyl phosphate | 10 |
| Volatile solvent | 73 |

Instead of using nitrocellulose I may use other cellulosic derivatives in preparing the size solution, as illustrated in the following formulas:

| | Percent |
|---|---|
| Ethyl cellulose | 15 |
| Volatile solvent | 85 | or

| | Percent |
|---|---|
| Cellulose acetate | 15 |
| Volatile solvent | 85 |

I now prepare a thermoplastic cement to be used for adhering the sized fabric 1 to another layer or layers of fabric or other material such as leather, metal foil, or composition material.

Various thermoplastic cements may be used, it being important, however, that none of these cements shall contain a cellulosic derivative, such as nitrocellulose, inasmuch as I have found that the presence of a cellulosic derivative tends to decrease the adhesiveness of the cement to the sized fabric 1 and the outer layers of the laminated material. Preferably, I employ a thermoplastic synthetic resin such as vinyl acetate, vinyl chloride, styrols, coumarone, polybasic acid and polyhydric alcohol resins such as glyceryl phthalate which may be combined with fatty acids or vegetable oils. The physical properties of these resins may be modified, if desired, by the addition of other ingredients. For example, they may be hardened by the addition of hard, fusible, high melting point resins such as ester gum (glyceryl ester of abietic acid), glyceryl ester of maleic acid, copal; or they may be softened and made more flexible by the addition of plasticizing agents such as tricresyl phosphate, dibutyl phthalate, dibutoxyethyl phthalate, or other nonvolatile miscible softeners.

One example of a thermoplastic cement which I have found suitable is obtained by intermixing the following ingredients in the percentages given by weight:

|  | Percent |
|---|---|
| Copolymer of vinyl chloride and acetate | 30 |
| Tricresyl phosphate | 10 |
| Volatile solvent | 60 |

The volatile solvent ingredient in the above formula may be acetone, ethylene dichloride, or any mixture of suitable volatile solvents having desirable evaporation characteristics.

Another example of a suitable thermoplastic cement is produced by intermixing the following:

|  | Percent |
|---|---|
| Hard coumarone | 20 |
| Soft coumarone | 20 |
| Tornesit (chlorinated rubber) | 3 |
| Ceresine wax | 7 |
| Solvent | 50 |

Figure 2:
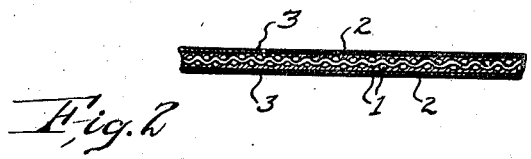
Fig. 2 is a view similar to Fig. 1 but illustrates the sized fabric coated on its surfaces with a thermoplastic cement.

After preparing the thermoplastic cement, the same is coated on one or both sides of the sized fabric 1 and allowed to dry. In Fig. 2 of the drawing, the sized fabric is illustrated as coated on both sides with a thin coating of thermoplastic cement 3. The thermoplastic cement may be applied to the sized fabric in various ways, as by knife or roller coating, spraying, brushing, or by dipping.

Figure 3:
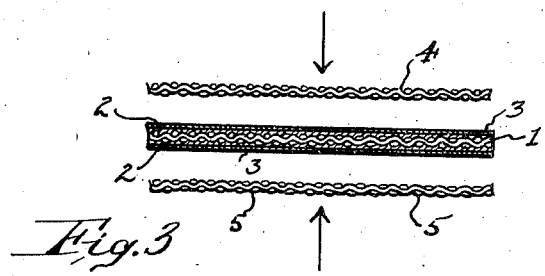
Fig. 3 is a view illustrating the application of outer fabric layers to the sized and coated material of Fig. 2
Figure 4:
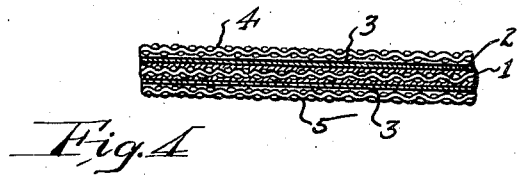
Fig. 4 is a fragmentary sectional view showing the completed laminated material.

The sized and coated fabric 1 is now ready to receive the outer layer or layers of material which are illustrated in Fig. 3 as fabric layers 4 and 5 although any suitable material such as leather, paper, metal foil, etc., may be used. The fabric layers 4 and 5 are applied to the surfaces of the sized and coated fabric 1 with pressure or heat or preferably both. Thus, a temperature of approximately 250° F. and the pressure exerted by an ordinary flat iron serves to soften the thermoplastic cement films 3 sufficiently so that the fabric layers 4 and 5 are firmly and permanently secured by the cement to the sized inner fabric layer 1, thereby producing the completed laminated material shown in Fig. 4.

The laminated material thus produced has a desired stiffness due to the presence of the cellulosic derivative size impregnated in the inner fabric layer 1, while the outer layers 4 and 5 give the laminated material the appearance and feel of an ordinary fabric. The thermoplastic cement films 3 provide a permanent adhesive bond that serves to fixedly retain the outer layers 4 and 5 in assembled relation to the inner layer 1 regardless of a great deal of laundering. The thermoplastic cement 3 also serves to protect the cellulosic size 2 against the injurious or damaging action of water and alkalies used in laundering.

The cellulosic size 2 though serving to give the laminated material a desirable stiffness does not make the material rigid, but permits the ready bending or flexing of the material in use, as is desired. During washing, the laminated material softens somewhat, thereby facilitating the ready cleansing of articles made from this material, whereas when the same is thereafter ironed, it again becomes stiff as is desired and without the use of starch. The novel laminated material of the present invention is especially suitable for use in making collars, cuffs, shirt fronts, shoes, corsets, leather goods, labels, and the like where a degree of stiffness is desired.

It will be understood that instead of fabricating a triple layer laminated material, I may produce a two, four or other multiple layer fabric or material. It will be evident that the percentages of ingredients given in the preceding formulas may be varied within reasonable limits and yet keep within the spirit and scope of this invention as defined in the following claims.

What I claim is:

1. A laminated textile fabric for use in wearing apparel having a cellulose derivative in only one layer comprising a base layer of a textile fabric stiffened by a coating of a cellulose derivative and an outer layer of textile fabric adhered to said stiffened base layer by an intermediate layer of a thermoplastic vinyl polymer cement.

2. A laminated textile fabric for use in wearing apparel having a cellulose derivative in only one layer comprising a base layer of a textile fabric stiffened by a coating of a cellulose derivative and an outer layer of textile fabric adhered to said stiffened base layer by an intermediate layer of a thermoplastic resin selected from the group consisting of polymers of vinyl acetate, vinyl chloride, styrol, coumarone and copolymer of vinyl chloride and vinyl acetate.

3. A laminated textile fabric for use in wearing apparel having a cellulose derivative in only one layer comprising a base layer of a textile fabric stiffened by a coating of a cellulose derivative and an outer layer of textile fabric adhered to said stiffened base layer by an intermediate layer of the plasticized thermoplastic copolymer of vinyl chloride and vinyl acetate.

4. A laminated textile fabric for use in wearing apparel having a cellulose derivative in only one layer comprising a base layer of a textile fabric stiffened by a coating of a cellulose derivative and an outer layer of textile fabric adhered to said stiffened base layer by an intermediate layer of coumarone resin.

GUSTAVE KLINKENSTEIN.